(12) United States Patent
Kim

(10) Patent No.: US 8,725,723 B2
(45) Date of Patent: May 13, 2014

(54) METHOD FOR SEARCHING RELATION SUDDEN RISING WORD AND SYSTEM THEREOF

(75) Inventor: Dong Wook Kim, Seongnam-si (KR)

(73) Assignee: NHN Corporation, Gyeonggi-Do (KR)

( * ) Notice: Subject to any disclaimer, the term of this patent is extended or adjusted under 35 U.S.C. 154(b) by 578 days.

(21) Appl. No.: 12/677,454

(22) PCT Filed: Aug. 8, 2008

(86) PCT No.: PCT/KR2008/004634
§ 371 (c)(1),
(2), (4) Date: Mar. 10, 2010

(87) PCT Pub. No.: WO2009/038285
PCT Pub. Date: Mar. 26, 2009

(65) Prior Publication Data
US 2011/0010362 A1    Jan. 13, 2011

(30) Foreign Application Priority Data
Sep. 18, 2007    (KR) .................. 10-2007-0094545

(51) Int. Cl.
*G06F 17/30*    (2006.01)

(52) U.S. Cl.
USPC .................. 707/722; 707/748; 707/750

(58) Field of Classification Search
USPC .................. 707/722, 750, 748
See application file for complete search history.

(56) References Cited

U.S. PATENT DOCUMENTS

| 6,169,986 | B1* | 1/2001 | Bowman et al. ............... 1/1 |
| 7,051,023 | B2* | 5/2006 | Kapur et al. ............ 707/690 |
| 7,577,646 | B2 | 8/2009 | Chien et al. |
| 7,941,436 | B2* | 5/2011 | Popescul et al. ......... 707/750 |
| 2002/0184212 | A1* | 12/2002 | Ugai et al. .................. 707/6 |
| 2008/0033938 | A1* | 2/2008 | Okamoto et al. ............ 707/5 |
| 2008/0126311 | A1* | 5/2008 | Rowley ....................... 707/3 |
| 2008/0255935 | A1* | 10/2008 | Madhavan et al. ........... 707/5 |
| 2009/0049029 | A1* | 2/2009 | Choi et al. ................... 707/5 |
| 2009/0063461 | A1* | 3/2009 | Wang et al. ................. 707/5 |
| 2009/0290689 | A1* | 11/2009 | Watanabe et al. ....... 379/88.01 |

FOREIGN PATENT DOCUMENTS

| JP | 10-320419 | 12/1998 |
| JP | 2007-034466 | 2/2007 |
| KR | 100522029 | 10/2005 |
| KR | 1020050102869 | 10/2005 |
| KR | 1020060029709 | 4/2006 |
| KR | 1020070095552 | 10/2007 |
| WO | 2006/118814 | 9/2006 |

* cited by examiner

*Primary Examiner* — Isaac M Woo
*Assistant Examiner* — Tiffany Thuy Bui
(74) *Attorney, Agent, or Firm* — Harness, Dickey & Pierce, P.L.C.

(57) ABSTRACT

A method and system for searching for a related term having rapidly increasing popularity is provided. The method includes: analyzing a search log and extracting a daily search frequency for each search term; comparing peaks of the daily search frequency, extracted for each search term in a predetermined period; and analyzing relevance between candidate search terms in which the peaks have occurred together in the predetermined period as a result of the comparison and filtering out a candidate search term having no relevance.

21 Claims, 7 Drawing Sheets

METHOD FOR SEARCHING RELATION SUDDEN RISING WORD AND SYSTEM THEREOF

CROSS REFERENCE TO RELATED APPLICATIONS

This application is the National Stage of International Application No. PCT/KR2008/004634, filed Aug. 8, 2008, and claims priority from and the benefit of Korean Patent Application No. 10-2007-0094545, filed on Sep. 18, 2007, which are both hereby incorporated by reference for all purposes as if fully set forth herein.

BACKGROUND OF THE INVENTION

1. Field of the Invention

The present invention relates to an apparatus and a system for searching for a related term having rapidly increasing popularity, and more particularly, to an apparatus and a system for searching for a related term having rapidly increasing popularity in which related term having the same peak which represents a change of a search frequency over times.

2. Discussion of the Background

A searching service system which provides a searching service generally provides users with search results corresponding to the search according to a query (for example, web pages containing the search query, articles including the search query, images with filenames including the search query, and the like) when a search query is inputted from users.

However, recent searching service systems, for the purpose of providing more accurate and faster search results, provide users with a related search query which is extracted when there is relevance with the inputted search query. This means that a searching service system usually provides users with different search results according to the inputted query. As an example, a search result when a user inputs "motor vehicle" is different from a search result when a user inputs "car". Consequently, a user would like to input a search query having higher relevance to desired information, yet there are times when the users are having difficulties coming up with such search queries. Consequently, recent searching service systems provide users with search queries which are related to the inputted search queries to enable users to perform searching with other search queries.

Here, the related search query may refer to a search query which may be a higher concept or a lower concept for the inputted search query ("Foreign language" when "Japanese" is inputted, or "Japanese" when "Foreign language" is inputted), to a search query which is a synonym with the inputted query ("bookstore" when "bookshop" is inputted), to a search query which has a similar meaning with the inputted query ("tail" when "rear" is inputted), to a search query which has a related search term ("saw, seen, seeing" when "see" is inputted), and other search queries having related terms in their meaning. However, the related search queries are not limited to the queries having a related term in their meaning and may refer to the search queries from various perspectives, when "Chanho Park" is inputted from a user, "Baseball" which is his occupation, "Major League" which is a league he belongs to, "Hanyang University" which is a school he graduated from, "Texas Rangers" which is his current team, and "Byeonghyeon Kim" who is another Korean baseball pitcher in the major league, may be showed.

However, a conventional method for searching for a related term is limited to search terms which are higher or lower in concepts, to search terms which have synonym relationships, or to search terms simply related to the search query only. Thus, the conventional method for searching for the related term has a disadvantage in that, there is a high possibility of extracting a result which is not related to an inputted search query, and a possibility of not satisfying a user demand for a service with higher quality where the desired information may more promptly be obtained with more accuracy.

Accordingly, a new technology which may provide users with a related term with a higher accuracy by effectively collecting data related to input search queries, by systematically analyzing the collected data, and by accurately determining the related term having rapidly increasing popularity using a change of a search frequency over time is required.

SUMMARY OF THE INVENTION

According to an aspect of the present invention, there is provided a method and system for searching for a related term having rapidly increasing popularity which has the same peak representing a change of a search frequency over time.

According to an aspect of the present invention, there is provided a method and system which provides a related term having rapidly increasing popularity by searching for peaks in a time distribution of a search term, finding out candidate search terms by comparing the peaks, and filtering out a candidate search term having no relevance from the candidate search terms.

According to embodiments of the present invention, a method for searching for a related term having rapidly increasing popularity includes: analyzing a search log and extracting a daily search frequency for each search term; comparing peaks of the daily search frequency, extracted for each search term in a predetermined period; and analyzing relevance between candidate search terms in which the peaks have occurred together in the predetermined period as a result of the comparison and filtering out a candidate search term having no relevance.

According to embodiments of the present invention, a system for searching for a related term having rapidly increasing popularity includes: an extraction unit analyzing a search log and extracting daily search frequency for each search term; a comparison unit analyzing a search log and comparing the extracted daily search frequency for each search term; and a filtering unit analyzing relevance between candidate search terms in which peaks have occurred together in the predetermined period as a result of the comparison and filtering out a candidate search term having no relevance.

According to the present invention, it is possible to provide a method and system for searching for a related term having rapidly increasing popularity which has the same peak representing a change of a search frequency over time.

According to the present invention, it is possible to provide a method and system for searching for a related term having rapidly increasing popularity by searching for peaks in a time distribution of a search term, searching for candidate search terms by comparing the peaks, and filtering out a candidate search term having no relevance.

DETAILED DESCRIPTION OF THE ILLUSTRATED EMBODIMENTS

Figure 1:
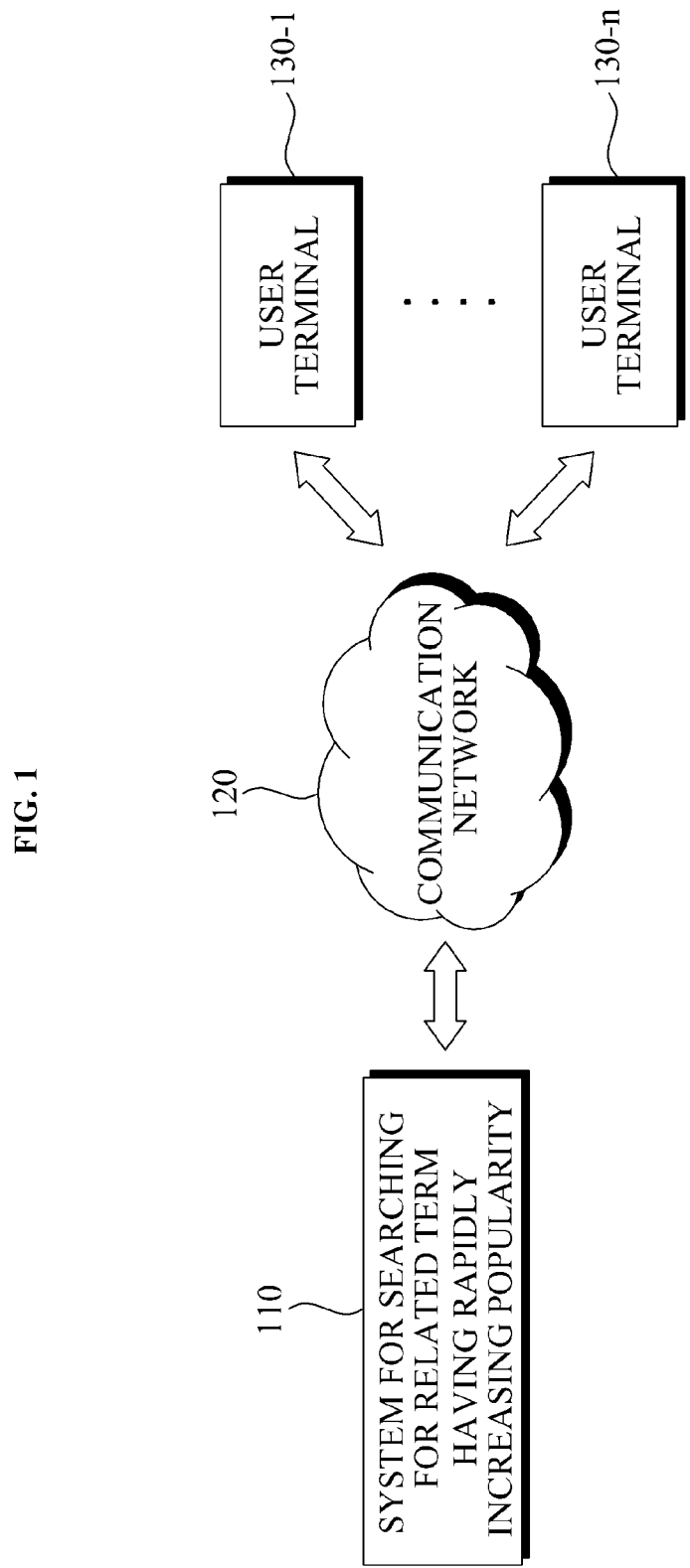
FIG. 1 is a diagram illustrating an operational relationship between a system for searching for a related term having rapidly increasing popularity of the present invention and a user terminal.

FIG. 1 is a diagram illustrating an operational relationship between a system for searching for a related term having rapidly increasing popularity of the present invention and a user terminal.

Referring to FIG. 1, a system 110 for searching for a related term having rapidly increasing popularity provides search terms which are inputted from users using user terminals 130-1 to 130-n via a communication network 120. The communication network 120 may include various wired and wireless communication network data communication between the system 110 for searching for the related term having rapidly increasing popularity and the user terminals 130-1 to 130-n and the Internet. The user terminals 130-1 to 130-n are inputted with search terms which are related to a desired object to be searched for from a user, and forwards the search terms to the system 110 for searching for the related term having rapidly increasing popularity via the communication network 120.

The system 110 for searching for the related term having rapidly increasing popularity records and maintains a search log including a daily search frequency for each search term which is inputted by the users.

Figure 2:
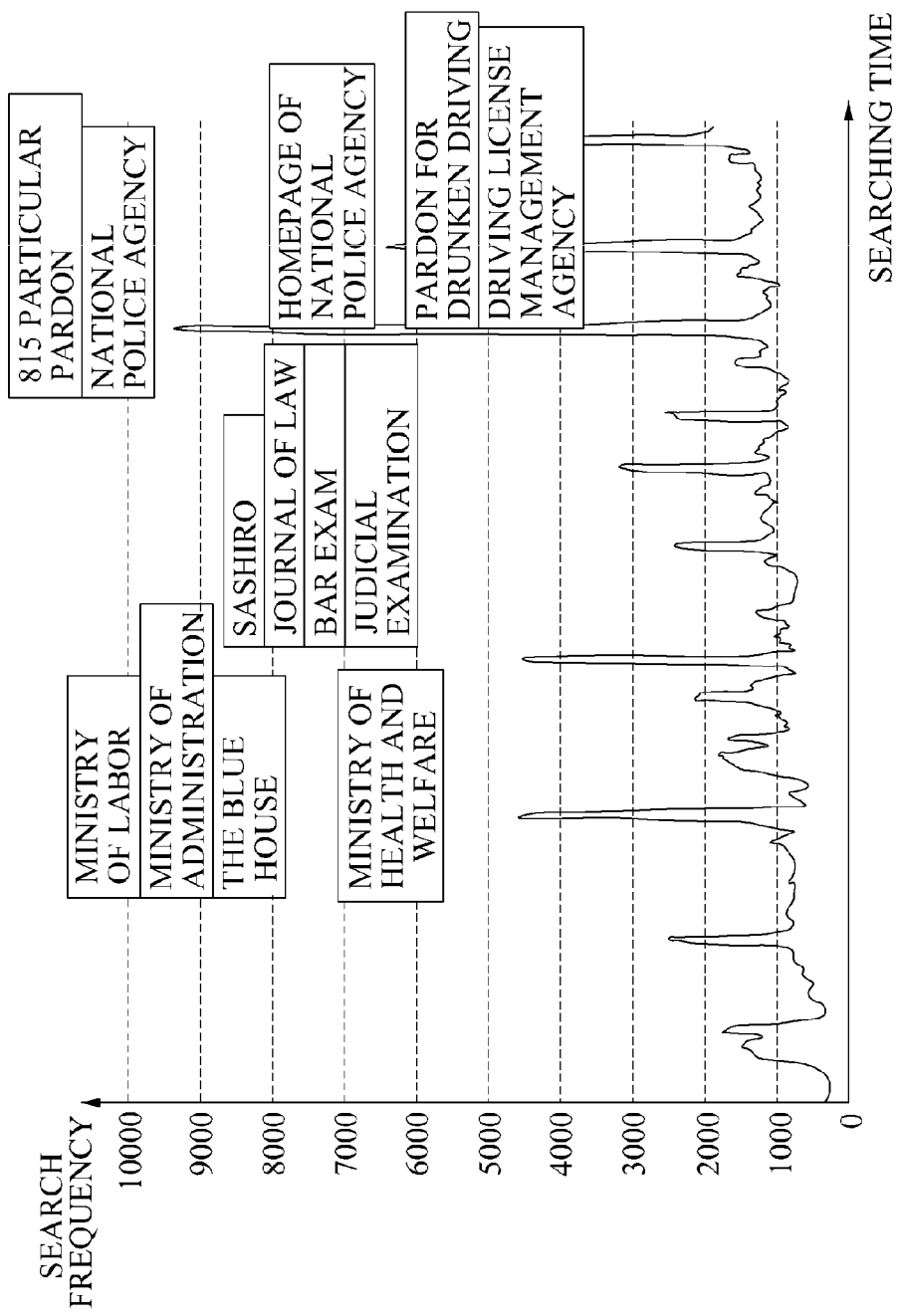
FIG. 2 is a diagram illustrating an example of a daily search frequency for each search term according to the present invention.

FIG. 2 is a diagram illustrating an example of a daily search frequency for each search term according to the present invention.

Referring to FIG. 2, the daily search frequency varies every day. This is due to a fact that a number of user input for a search term varies depending on issues or interests of society at the current time. That is, a peak, in which a daily search frequency for each search term occurs over time, indicates a point when the search term becomes an issue of the society or when the search term is meaningful. Similarly, search terms which share the peak at the same time exist. There is a probability that such search terms have relevance with each other.

As illustrated in FIG. 2, the system 110 for searching for the related term having rapidly increasing popularity searches for search terms having the same peak which indicates changes in daily search frequency over time.

As an example, when a search term of 'Ministry of Justice' has been inputted from user terminals 130-1 to 130-n, the system 110 for searching for the related term having rapidly increasing popularity may extract other terms which have shown the same peak at the same time point such as the 'Ministry of Labor, Ministry of Administration, Blue House, Ministry of Health and Welfare, Sashiro, Journal of Law, Bar examination, Judicial examination, 815 special pardons, homepage of National Police Agency, pardons for drunken driving, and Drive License Management Agency'.

The system 110 for searching for the related term having rapidly increasing popularity, as illustrated in FIG. 2, searches for the peaks in a time distribution, compares the retrieved peaks to find candidate search terms, and filters out a candidate search term having no relevance from the candidate search terms, thereby searching for the related term having rapidly increasing popularity with relevance.

The system 110 for searching for the related term having rapidly increasing popularity provides users with the retrieved related term having rapidly increasing popularity via the user terminals 130-1 to 130-n in the communication network 120.

Figure 3:
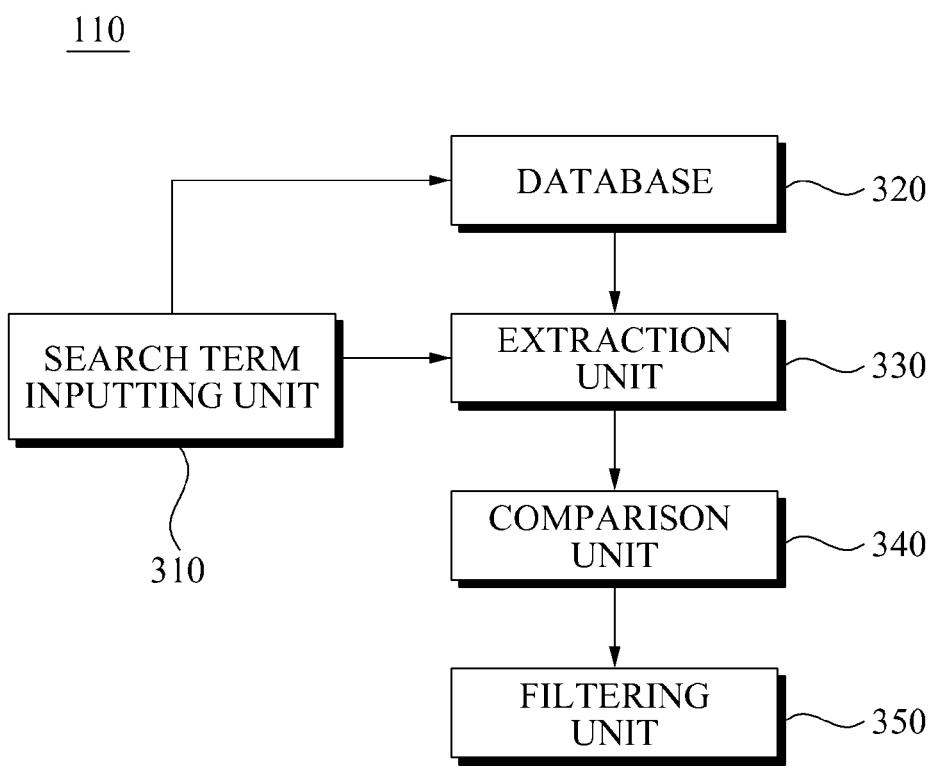
FIG. 3 is a diagram illustrating a configuration of a system for searching for a related term having rapidly increasing popularity according to an embodiment of the present invention.

FIG. 3 is a diagram illustrating a configuration of the system 110 of FIG. 1 for searching for a related term having rapidly increasing popularity according to an embodiment of the present invention.

Referring to FIG. 3, the system 110 for searching for the related term having rapidly increasing popularity includes a search term input unit 310, a database 320, an extraction unit 330, a comparison unit 340 and a filtering unit 350.

The search term input unit 310 receives search terms from users. That is, the search term input unit 310 is inputted with search terms which may be related to a desired object from users.

The database 320 records and maintains a search log including a daily search frequency for each search term. In other words, the database 320 may record and maintain the search log including time information of inputted search terms, a daily search frequency for each search term, and the like.

The extraction unit 330 extracts the daily search frequency of each search term by referring to the database 320 and analyzes the search log. The extraction unit 330 extracts the daily search frequency of each search term from the database 320 in a predetermined period.

Also, the extraction unit 330 analyzes the daily search frequency of each search term and extracts a peak with rapid increase or decrease in a short period of time. In other words, the extraction unit 330 analyzes the daily search frequency of each search and extracts a search term whose search frequency increases more rapidly than a predetermined reference value of increasing and decreases more rapidly than a predetermined reference value of decreasing, and extracts time information when the peak has occurred. As an example, as the analysis result of the daily search frequency of each search term, the extraction unit 330 may extract a search term in which a peak has occurred and time information when the peak has occurred, the peak showing a rapid increase of popularity 10 times within a day and also a rapid decrease of popularity also 10 times within a week. As an example, an extraction unit 330 may extract a search term and time information in a pair as in (Lee Hyori, July 2) and (Ministry of Justice, June 24).

The comparison unit 340 compares the daily search frequency extracted for each search term in a predetermined period. In other words, the comparison unit 340 compares peaks for the daily search frequency for each search term and searches for candidate search terms having the same peak in the same period as a result of the comparison. Also, the comparison unit 340 may analyze time information of a rapid increase for the peaks being compared and the time information of a rapid decrease and may establish the predetermined period so that the time information of the rapid decrease is greater than the time information of the rapid increase. As an example, it is assumed that a date of increase for a specific peak is peak.up, and a date of decrease for a specific peak is peak.down and there are a first peak (peak1) and a second peak (peak2), when |peak1.up−peak2.up|<delta1 and |peak1.down−peak2.down|<delta2, it may be assumed that the first peak and the second peak are identical peaks. Here, delta1 refers to a time difference for an increase of the first peak and the second peak, and delta2 refers to a time difference for a decrease of the first peak and the second peak. Since the decrease may largely differ in comparison to the increase in general, the comparison unit 340 may compare the peaks of the extracted daily search frequency for each search term in the predetermined period so as to have a larger delta2 value than a delta1 value.

The filtering unit 350 analyzes relevance between the candidate search terms in which the peaks have occurred together in the predetermined period as a result of the comparison and filters out a candidate search term having no relevance. In other words, the filtering unit 350 analyzes the candidate search terms in which the peaks have occurred together in the predetermined period as the result of the comparison, determines whether relevance exists between the search terms, and filters out a candidate search term having no relevance from the candidate search terms as the result of the determination. As an example, the filtering unit 350 analyzes the candidate search terms, and, when they are related search terms, may perform filtering so that the related search terms may be selected as related search terms with rapidly increasing popularity. As an example, the filtering unit 350 may measure a number of search sessions where the search terms are inputted, and a number of search sessions where a pair of search terms included in the search terms are inputted, determine whether correlation exists in search terms, and filter out a candidate search term from the candidate search terms as a result of the determination. As an example, the filtering unit 350 may measure a number of user identifiers where the search terms are inputted and a number of user identifiers where a pair of search terms included in the search terms are inputted to determine whether the relevance exists between the search terms and filter out a candidate search term having no relevance from the candidate search terms according to the determination result. As an example, the filtering unit 350 may measure a number of Internet Protocol (IP) addresses where the above search terms are inputted, and a number of IP addresses where a pair of search terms including the search term are inputted to determine relevance and filter out a candidate search term having no relevance from the candidate search terms according to the relevance decision result. As an example, the filtering unit 350 may analyze the search terms, when a single search term is included in a portion of another search term, determine there is relevance between the search terms, and consequently, may determine the search terms as related terms having rapidly increasing popularity.

Similarly, the system 110 for searching for the related term having rapidly increasing popularity may provide the related term having rapidly increasing popularity by searching for peaks in a time distribution of search terms, finding candidate search terms by comparing the peaks, and filtering out a candidate search term having no relevance from the candidate search terms.

Figure 4:
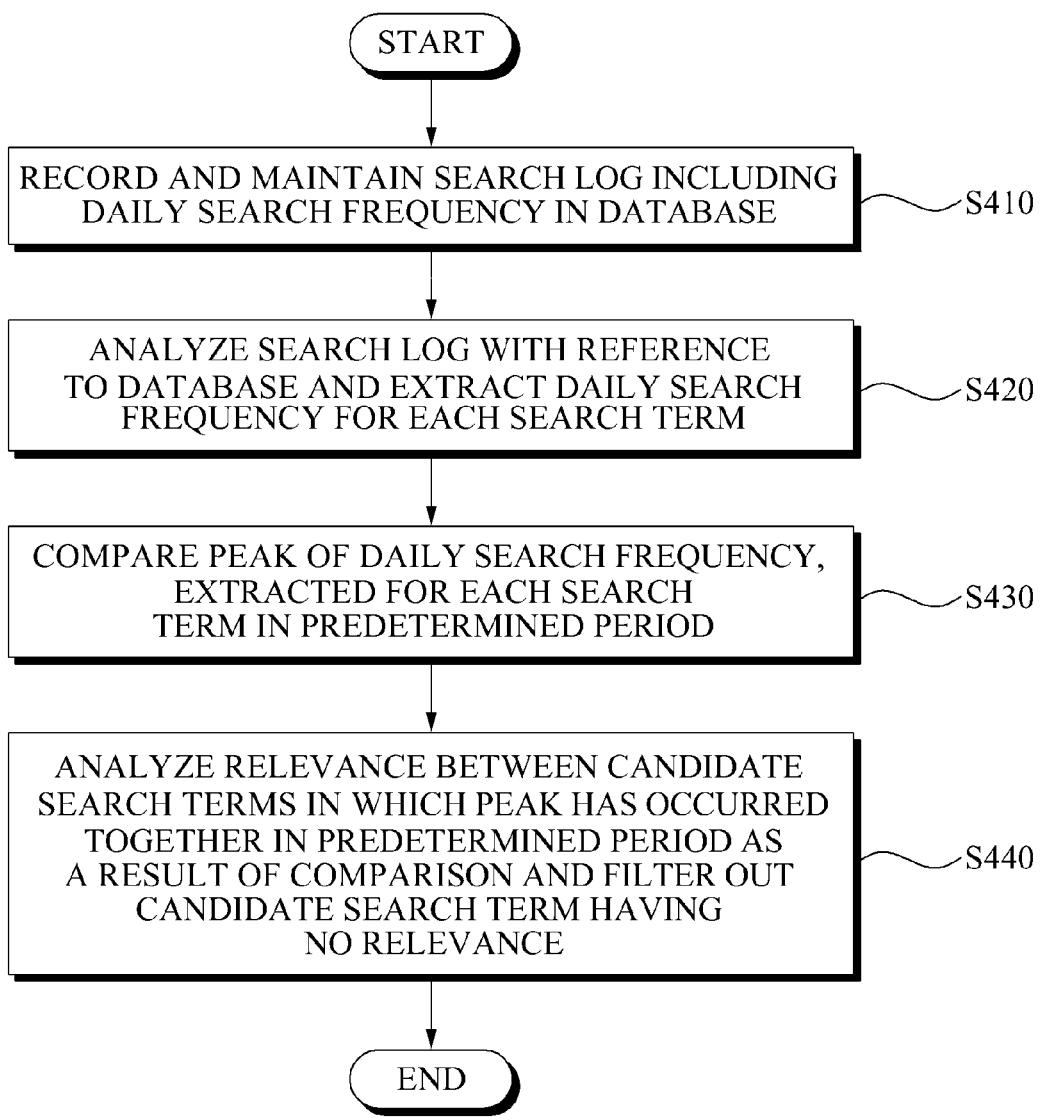
FIG. 4 is a flowchart illustrating a method for searching for a related term having rapidly increasing popularity according an embodiment of the present invention.

FIG. 4 is a flowchart illustrating a method for searching for a related term having rapidly increasing popularity according to an embodiment of the present invention.

Referring to FIG. 4, the system 110 for searching for the related term having rapidly increasing popularity records and maintains a search log in the database. In other words, in operation S410, the system 110 for searching for the related term having rapidly increasing popularity may record and maintain the search log including time information and the search frequency regarding the search terms inputted by users.

In operation S420, the system 110 for searching for the related term having rapidly increasing popularity refers to the database, and analyzes the search log to extract a daily search frequency for each search term.

Figure 5:
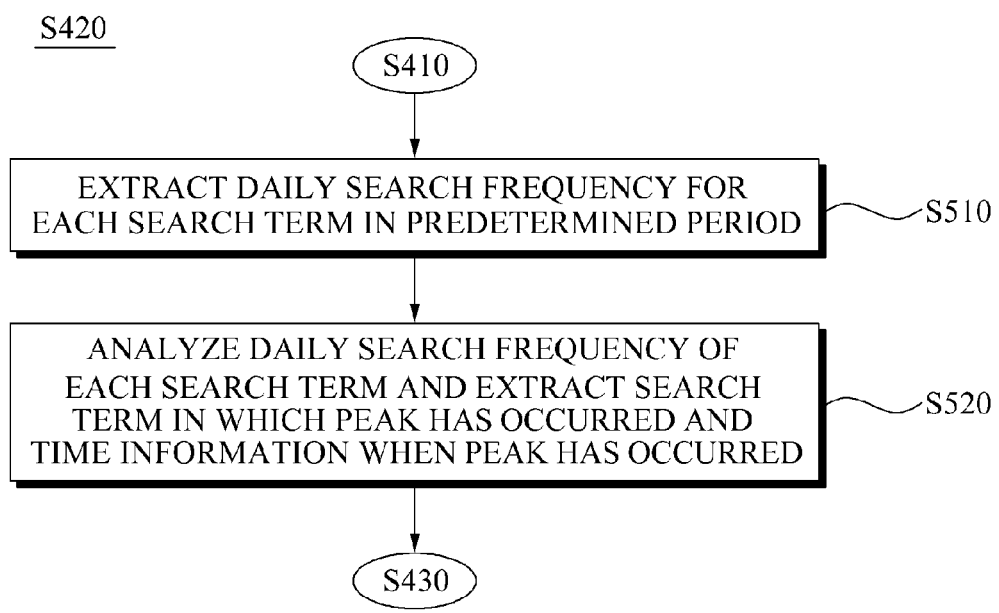
FIG. 5 is a flowchart illustrating operations of extracting a daily search frequency for each search term according to an embodiment of the present invention.

FIG. 5 is a flowchart illustrating operations of extracting a daily search frequency for each search term according to an embodiment of the present invention.

Referring to FIG. 5, the system 110 for searching for the related term having rapidly increasing popularity extracts a daily search frequency for each search term in a predetermined period in operation S510. That is, in S510, the system 110 for searching for the related term having rapidly increasing popularity may extract the daily search frequency for each search term in the predetermined period as illustrated in FIG. 2.

In operation S520, the system 110 for searching for the related term having rapidly increasing popularity analyzes the daily search frequency of each search term and extracts a search term whose search frequency increases more rapidly than a predetermined reference value of increasing and decreases more rapidly than a predetermined reference value of decreasing, and extracts time information when the peak has occurred. As an example, in operation S520, the system 110 for searching for the related term having rapidly increasing popularity extracts a search term in which a peak has occurred and time information when the peak has occurred, the peak showing a rapid increase of popularity 10 times within a day and also a rapid decrease of popularity 10 times within a week. As an example, the system 110 for searching for the related term having rapidly increasing popularity may extract a search term and time information in a pair as in (Lee Hyori, July 2) and (Ministry of Justice, June 24).

In operation S430, the system 110 for searching for the related term having rapidly increasing popularity compares the peaks for the extracted daily search frequency of each search term. Also, in operation S430, the system 110 for searching for the related term having rapidly increasing popularity may analyze time information of a rapid increase and time information of a rapid decrease of peaks to be compared and establish the predetermined period so that the time information of the rapid decrease is greater than the time information of the rapid increase.

Figure 6:
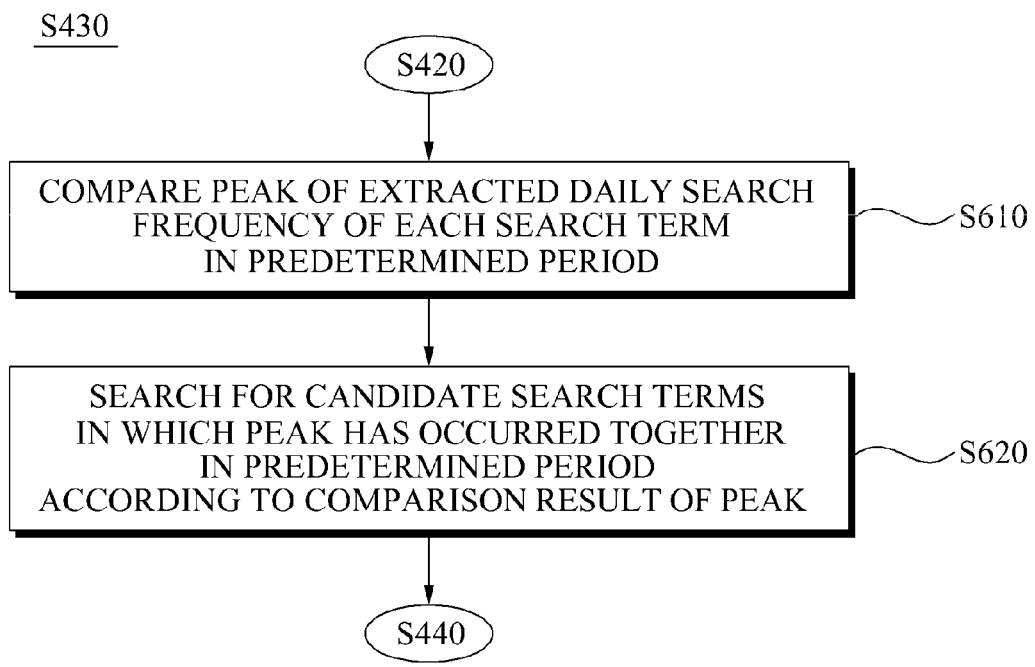
FIG. 6 is a flowchart illustrating operations of comparing peaks of a daily search frequency for each search term according to an embodiment of the present invention.

FIG. 6 is a flowchart illustrating operations of comparing peaks of a daily search frequency for each search term according to an embodiment of the present invention.

Referring to FIG. 6, the system 110 for searching for the related term having rapidly increasing popularity compares the peaks of the extracted search term in the predetermined period.

In operation S620, the system 110 for searching for the related term having rapidly increasing popularity, according to the peak comparison result, searches for candidate search terms in which peaks have occurred together in a predetermined period.

In operation S440, the system 110 for searching for the related term having rapidly increasing popularity analyzes relevance between candidate search terms in which peaks have occurred together in the predetermined period as a result of the comparison and filters out a candidate search term having no relevance.

Figure 7:
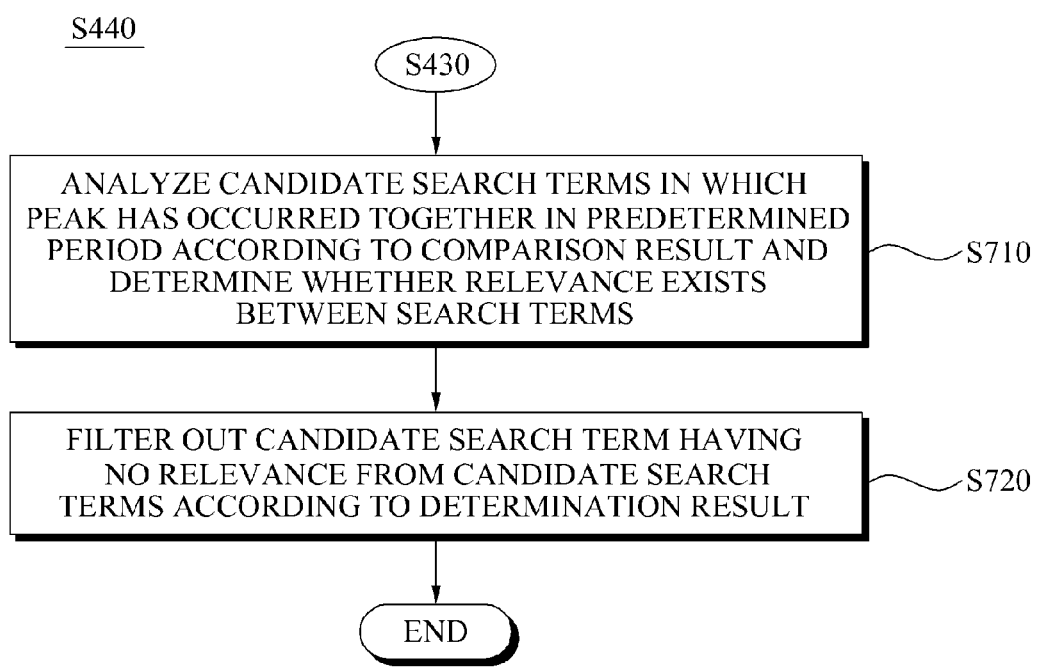
FIG. 7 is a flowchart illustrating operations of filtering out a search term having no relevance according to an embodiment of the present invention.

FIG. 7 is a flowchart illustrating operations of filtering out a search term having no relevance according to an embodiment of the present invention.

Referring to FIG. 7, in operation S710, the system 110 for searching for the related term having rapidly increasing popularity analyzes the candidate search terms in which the peaks have occurred together in the predetermined period as the result of the comparison and determines whether relevance exists between the search terms. In operation S710, the system 110 for searching for the related term having rapidly increasing popularity analyzes the search terms and determines the analyzed search term has relevance when the analyzed search term is a correlative search term. Specifically, in operation S710, the system 110 for searching for the related term having rapidly increasing popularity may measure a number of search sessions where the search terms are inputted and a number of search sessions where a pair of search terms included in the search terms are inputted. As an example, in operation S710, the system 110 for searching for the related term having rapidly increasing popularity may measure a number of user identifiers where the search terms are inputted and a number of user identifiers wherein the pair of the search terms included in the search terms are inputted, and determines whether correlation exists. As an example, in operation S710, the system 110 for searching for the related term having rapidly increasing popularity may measure a number of IP addresses where the search terms are inputted and a number of IP addresses where a pair of search terms including the search term are inputted, and determines whether correlation exists. As an example, in S710, the system 110 for searching for the related term having rapidly increasing popularity may analyze the search terms, and, when a single search term is included in a portion of another search term, determines there is relevance between the search terms.

In operation S720, the system 110 for searching for the related term having rapidly increasing popularity filters out a candidate search term having no relevance from the candidate search terms according to the relevance decision result. That is, in operation S720, the system 110 for searching for the related term having a rapidly increasing popularity may filter out the candidate search term having no relevance from the above candidate search terms according to the relevance decision result and provide the remaining candidate search term as a related term having the rapidly increasing popularity from among the candidate search terms.

As described above, a method for searching for a related term having rapidly increasing popularity according to the present invention may provide a related term having a rapidly increasing popularity by searching for peaks in a time distribution of search terms, finding candidate search terms by comparing the peaks, and filtering out a candidate search term having no relevance.

The method for searching for the related term having rapidly increasing popularity according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for searching for a related term having rapidly increasing popularity, the method comprising:
analyzing a search log and extracting a daily search frequency for search terms in the search log;
comparing peaks of the daily search frequency extracted for the search terms in a period;
analyzing relevance between candidate search terms for which the peaks have occurred together in the period with at least one of the search terms as a result of the comparison, and filtering out a candidate search term of the candidate search terms having no relevance; and
wherein the extracting of the daily search frequency for search terms in the search log includes,
extracting the daily search frequency for the search terms in the period,
analyzing the daily search frequency for the search terms,
extracting at least one search term having a search frequency that increases more rapidly than an increase reference value and decreases more rapidly than a decrease reference value, and
extracting time information when a peak of the at least one search term has occurred.

2. The method of claim 1, wherein the comparing of the peaks of the extracted daily search frequency for the search terms in the period comprises:
comparing the peaks of the extracted daily search frequency for the search terms in the period; and
searching for candidate search terms for which the peaks have occurred together in the period with at least one of the search terms as the result of the comparison.

3. The method of claim 1, wherein the analyzing of relevance between candidate search terms for which the peaks have occurred together with at least one of the search terms in the period as the result of the comparison and filtering out the candidate search term having no relevance comprises:
analyzing the candidate search terms for which the peaks have occurred together in the period as the result of the comparison and determining whether relevance exists between the candidate search terms and the search terms; and filtering out a candidate search term having no relevance from the candidate search terms as the result of the determination.

4. The method of claim 3, wherein the determining of whether relevance exists between the candidate search terms comprises analyzing the candidate search terms and determining the analyzed candidate search term has relevance when the analyzed candidate search term is a correlative of at least one of the search terms.

5. The method of claim 3, wherein the determining of whether relevance exists between the candidate search terms comprises measuring a number of search sessions in which the search terms are inputted and a number of search sessions in which a pair of search terms comprising at least one search term are inputted, and determining whether correlation exists between the candidate search terms and at least one of the search terms.

6. The method of claim 3, wherein the determining of whether relevance exists between the candidate search terms comprises measuring a number of user identifiers corresponding to where the search terms are inputted and a number of user identifiers corresponding to where a pair of the search terms comprising at least one search term are inputted, and determining whether correlation exists between the candidate search terms and at least one of the search terms.

7. The method of claim 3, wherein the determining of whether relevance exists between the candidate search terms comprises measuring a number of Internet Protocol (IP) addresses where the search terms are inputted and a number of IP addresses where a pair of search terms comprising the search term are inputted, and determining whether correlation exists between the candidate search terms and at least one of the search terms.

8. The method of claim 3, wherein the determining of whether relevance exists between the candidate search terms comprises analyzing the search terms and the candidate search terms, and, when a single search term is in a portion of the candidate search term, determining that there is relevance between the candidate search term and the search terms, and, when a single candidate search term is included in a portion of at least one search term, determining that there is relevance between the candidate search term and the search terms.

9. The method of claim 1, further comprising:
recording and maintaining the search log comprising the daily search frequency in a database,
wherein the analyzing of the search log and extracting of the daily search frequency for the search terms comprises analyzing the search log with reference to the database and extracting the daily search frequency for the search terms.

10. A method for searching for a related term having rapidly increasing popularity, the method comprising:
analyzing a search log and extracting a daily search frequency for search terms in the search log;
comparing peaks of the daily search frequency extracted for the search terms in a period;
analyzing relevance between candidate search terms for which the peaks have occurred together in the period with at least one of the search terms as a result of the comparison, and filtering out a candidate search term of the candidate search terms having no relevance; and
analyzing time information of rapid increase and time information of rapid decrease of the peaks to be compared and establishing the period so that the time information of rapid decrease is greater than the time information of rapid increase.

11. A non-transitory computer-readable storage medium having stored thereon, a computer program, which when executed by at least one processor, causes the at least one processor to perform acts comprising:
analyzing a search log and extracting a daily search frequency for search terms of the search log;
comparing peaks of the daily search frequency extracted for the search terms in a period; and
analyzing relevance between candidate search terms for which the peaks have occurred together in the period with at least one of the search terms as a result of the comparison, and filtering out a candidate search term of the candidate search terms having no relevance;
wherein the extracting of the daily search frequency for search terms in the search log includes,
extracting the daily search frequency for the search terms in the period,
analyzing the daily search frequency for the search terms,
extracting at least one search term having a search frequency that increases more rapidly than an increase reference value and decreases more rapidly than a decrease reference value, and
extracting time information when a peak of the at least one search term has occurred.

12. A system for searching for a related term having rapidly increasing popularity, the system comprising:
a storage device;
a database, stored on the storage device, and configured to store a search log;
an extraction unit to analyze the search log and extract daily search frequency for search terms in the search log;
a comparison unit to analyze the search log and compare the extracted daily search frequency for the search terms; and
a filtering unit to analyze relevance between candidate search terms in which peaks have occurred together in a period with at least one of the search terms as a result of the comparison and to filter out a candidate search term of the candidate search terms having no relevance to the search terms;
wherein the extraction unit is operable to,
extract the daily search frequency for the search terms within the period,
analyze the daily search frequency for the search terms,
extract at least one search term having a search frequency that increases more rapidly than an increase reference value that decreases more rapidly than a decrease reference value, and
extract time information when a peak of the at least one search term has occurred.

13. The system of claim 12, wherein the comparison unit is operable to compare the peaks of the extracted daily search frequency for the search terms in the period, and search for candidate search terms for which peaks have occurred together in the period with at least one of the search terms as the result of the comparison.

14. The system of claim 12, wherein the filtering unit is operable to analyze the candidate search terms for which the peaks have occurred together in the period with at least one of the search terms as the result of the comparison and determine whether relevance exists between the candidate search terms and at least one of the search terms, and to filter out a candidate search term having no relevance from the candidate search terms as the result of the determination.

15. The system of claim 12, wherein the filtering unit is operable to analyze the candidate search terms and determine that at least one of the analyzed candidate search terms has relevance when the at least one of the analyzed candidate search terms is correlative with at least one search term.

16. The system of claim 12, wherein the filtering unit is operable to measure a number of search sessions in which the search terms are inputted and a number of search sessions in which a pair of search terms comprising the search terms are inputted, to determine whether correlation exists, and to filter out a candidate search term having no relevance from the candidate search terms as a result of the determination.

17. The system of claim 12, wherein the filtering unit is operable to measure a number of user identifiers corresponding to where the search terms are inputted and a number of user identifiers corresponding to where a pair of the search terms comprising the search terms are inputted, to determine whether correlation exists, and to filter out a candidate search term having no relevance from the candidate search terms as a result of the determination.

18. The system of claim 12, wherein the filtering unit is operable to measure a number of IP addresses where the search terms are inputted and a number of IP addresses where a pair of search terms comprising the search term are inputted, to determine whether correlation exists, and to filter out a candidate search term having no relevance from the candidate search terms as a result of the determination.

19. The system of claim 12, wherein the filtering unit is operable to analyze the search terms, and, when a single search term is in a portion of another search term, to determine that the search terms are relevant.

20. The system of claim 12, further comprising:
a database, stored on the storage device, and configured to record and maintain the search log comprising the daily search frequency;
wherein the extraction unit is operable to analyze the search log with reference to the database and to extract the daily search frequency for the search terms.

21. A system for searching for a related term having rapidly increasing popularity, the system comprising:
a storage device;
a database, stored on the storage device, and configured to store a search log;
an extraction unit to analyze the search log and extract daily search frequency for search terms in the search log;
a comparison unit to analyze the search log and compare the extracted daily search frequency for the search terms; and
a filtering unit to analyze relevance between candidate search terms in which peaks have occurred together in a period with at least one of the search terms as a result of the comparison and to filter out a candidate search term of the candidate search terms having no relevance to the search terms;
wherein the comparison unit is operable to,
analyze time information of a rapid increase and time information of a rapid decrease of the peaks to be compared, and
establish the period so that the time information of rapid decrease is greater than the time information of rapid increase.

* * * * *